(12) United States Patent
Kim (10) Patent No.: US 11,913,665 B2
(45) Date of Patent: Feb. 27, 2024

(54) PIPE CONNECTION STRUCTURE OF AIR-CONDITIONING SYSTEM

(71) Applicant: Tae Hyun Kim, Paju-si (KR)

(72) Inventor: Tae Hyun Kim, Paju-si (KR)

( * ) Notice: Subject to any disclaimer, the term of this patent is extended or adjusted under 35 U.S.C. 154(b) by 336 days.

(21) Appl. No.: 17/311,653

(22) PCT Filed: Dec. 27, 2019

(86) PCT No.: PCT/KR2019/012626
§ 371 (c)(1),
(2) Date: Jun. 7, 2021

(87) PCT Pub. No.: WO2020/116759
PCT Pub. Date: Jun. 11, 2020

(65) Prior Publication Data
US 2022/0107112 A1    Apr. 7, 2022

(30) Foreign Application Priority Data

| Dec. 8, 2018 | (KR) | .......................... 10-2018-0157637 |
| Dec. 23, 2018 | (KR) | .......................... 10-2018-0168033 |
| Jan. 26, 2019 | (KR) | .......................... 20-2019-0000394 |
| Mar. 14, 2019 | (KR) | .......................... 10-2019-0029336 |

(51) Int. Cl.
*F16L 25/00* (2006.01)
*F24F 13/02* (2006.01)
*F16B 2/24* (2006.01)
*F24F 13/06* (2006.01)

(52) U.S. Cl.
CPC .......... *F24F 13/0209* (2013.01); *F16B 2/245* (2013.01); *F24F 13/06* (2013.01)

(58) Field of Classification Search
CPC .............. F16L 25/0036; F16L 25/0045; F16L 25/0072; F16L 33/00; F16L 33/02; F16L 33/03; F16L 33/227; F16L 37/084; F16L 37/0847; F16B 2/245
See application file for complete search history.

(56) References Cited

U.S. PATENT DOCUMENTS

| 4,995,648 | A | 2/1991 | Jackson | |
| 2010/0140917 | A1* | 6/2010 | Sheremeta | .......... F16L 25/0045 |
| | | | | 285/24 |

FOREIGN PATENT DOCUMENTS

| KR | 10-2012-0035546 A | 4/2012 |
| KR | 20-2014-0002000 U | 1/2014 |
| KR | 10-1459276 B1 | 11/2014 |
| KR | 10-1516126 B1 | 5/2015 |

* cited by examiner

*Primary Examiner* — Aaron M Dunwoody
(74) *Attorney, Agent, or Firm* — Maschoff Brennan

(57) ABSTRACT

The present invention relates to a pipe connection structure of an air conditioning system, wherein a corrugated pipe (200) is detachably decoupled from/coupled to an object (100) to be coupled, the pipe connection structure comprising: a fixing plate (320) fixed to the object (100) to be coupled; and a clip (300) having a pressing protrusion (350) that is connected to the fixing plate (320) and is convexly formed in a direction facing the fixing plate (320), wherein in the state where the fixing plate (320) is fixed to the object (100) to be coupled, the end of the corrugated pipe (200) is inserted between the fixing plate (320) and the pressing projection (350) and is pressed by the pressing projection (350) so as not to be separated therefrom.

6 Claims, 7 Drawing Sheets

PIPE CONNECTION STRUCTURE OF AIR-CONDITIONING SYSTEM

TECHNICAL FIELD

The present invention relates to a pipe connection structure of an air-conditioning system to connect pipes in the air-conditioning system.

BACKGROUND ART

An air-conditioning system is installed for air circulation, and equipped with an air supply and exhaust capability to implement a function of indoor ventilation or room temperature control. The air-conditioning system is equipped with devices for intake or exhaust, and these devices are installed to be connected through pipes. Typically, a diffuser is provided. The diffuser is installed on a ceiling, wall or window, and connected to a corrugated pipe to suck indoor air and exhaust the indoor air to the outside through the corrugated pipe, or supplied with external air through the corrugated pipe to supply the external air indoors.

Meanwhile, in the above configuration, the corrugated pipe is connected to the diffuser through a bending or taping work. However, the bending or taping work is quite difficult and inconvenient because it is required to be performed while the corrugated pipe and the diffuser are held by the hand to prevent the corrugated pipe and the diffuser from being separated from a connected state. Particularly, since the diffuser is generally installed at a high position, a worker is required to perform the work subject to the high position while looking at the ceiling. Accordingly, the working time may increase and the risk may also increase.

(Patent Document 1) (Document 1) Korean Utility Model Registration No. 0241662 (Published on Oct. 11, 2001)

(Patent Document 2) (Document 2) Korean Patent Registration No. 0556213 (Published on Mar. 6, 2006)

(Patent Document 3) (Document 3) Korean Unexamined Patent Publication No. 10-2010-0118425 (Published on Nov. 5, 2010)

DISCLOSURE

Technical Problem

An object of the present invention is to provide a pipe connection structure of an air-conditioning system, in which a device and a pipe used in the air-conditioning system, especially a corrugated pipe is conveniently connected, so that the convenience of work may be improved and the safe work may be facilitated.

Technical Solution

In order to achieve the above purposes, the present invention suggests a pipe connection structure of an air-conditioning system, in which a clip is provided on a device used for the air-conditioning system so as to connect the pipe in a one-touch type.

Advantageous Effects

According to the present invention, the pipe are connected to the device used for the air-conditioning system in a one-touch type, so that the convenience of work can be improved. As a result, the working time can be remarkably reduced and the environment for enabling the worker to work safely can be generated.

BEST MODE

Mode for Invention

Hereinafter, the present invention will be described in detail with reference to the accompanying FIGS. 1 to 10.

As shown in the drawings, the present invention proposes a structure for allowing a corrugated pipe 200 to be detachably coupled to an object 100 to be coupled.

The object 100 is formed with a connection pipe 120 to which the corrugated pipe 200 may be connected. In the present invention, a diffuser, which is installed for intake or exhaust in an air conditioning system, is illustrated as an example. However, the present invention is not limited thereto, and the object 100 may be applied to any device formed with the connection pipe 120 to connect the corrugated pipe 200.

The corrugated pipe 200 may be a pipe that has a step formed at an end thereof and has no corrugation. This is because any structure configured to be inserted and latched to the clip 300 described later can be coupled to the clip.

According to the present invention, the clip 300 is formed on the object 100 to couple the corrugated pipe 200.

The clip 300 includes a fixing plate 320 fixed to an outer periphery of the connection pipe 120 and having a plate shape, and includes a pressing protrusion 350 extending from the fixing plate 320 and convexly formed in a direction facing the fixing plate 320. The pressing protrusion 350 may have a structure that protrudes in a triangular shape, and it is preferable that the highest point is formed to come into contact with the fixing plate 320.

The fixing plate 320 of the clip 300 comes into contact with the outer periphery of the connection plate 120 and fixed by welding or screw, so that the clip 300 may be installed on the connection plate 120.

When the clip 300 is installed on the connection plate 120, an inlet into which the corrugated pipe 200 may be inserted is formed between the pressing protrusion 350 and the fixing plate 320. When the end of the corrugated pipe 200 is inserted through the inlet, the corrugated pipe 200 is pressed by the pressing protrusion 350 and prevented from being separated from the inlet. Particularly, since the corrugated pipe 200 is formed with the corrugation, convex parts and concave parts are repeated, so that the pressing protrusion 350 is seated on the concave part, thereby stably supporting the corrugated pipe 200.

The pressing protrusion 350 may include a plurality of pressing protrusions formed in a height direction. In this case, the pressing protrusions 350 may be formed continuously with each other or may be formed at predetermined intervals. The plurality of pressing protrusions are provided in the above manner to increase a pressing force according to the number of pressing protrusions, thereby improving a coupling strength.

Hereinafter, the present invention will be described with exemplary embodiments.

Figure 1:
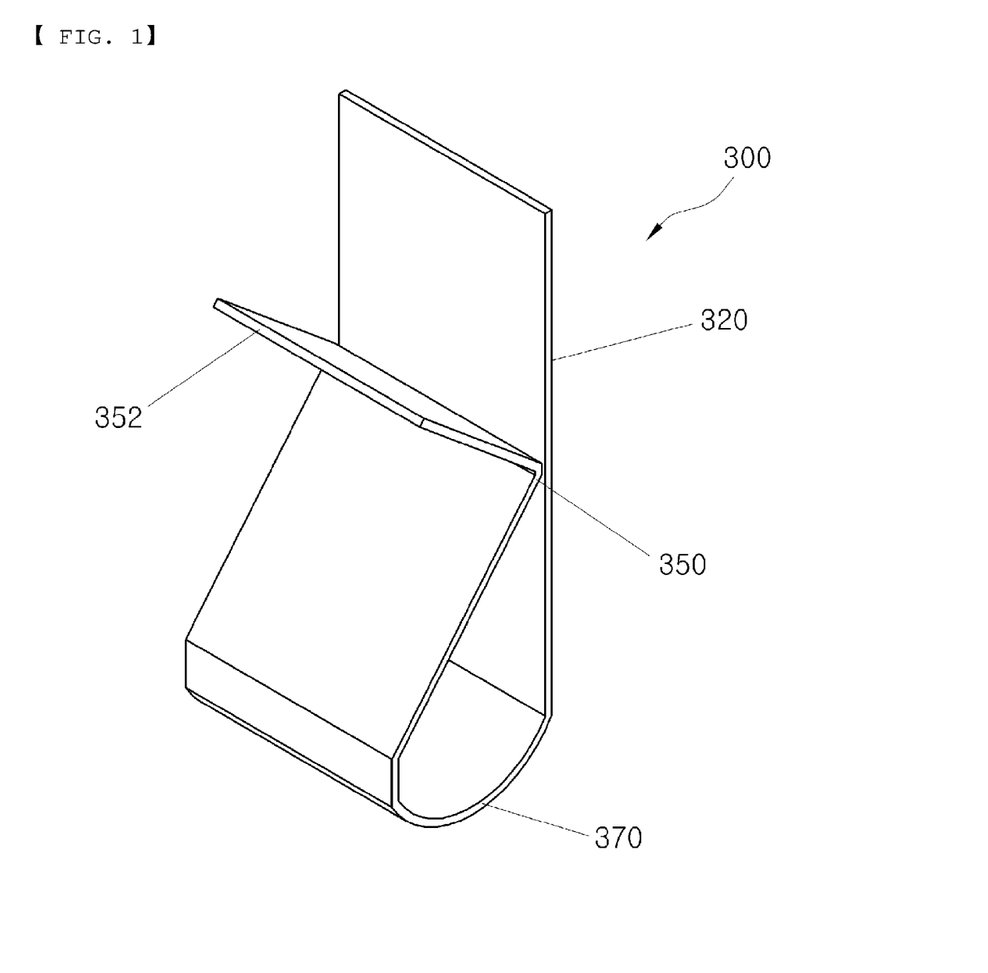
FIG. 1 is an exemplary view showing an example of a clip according to the present invention.
Figure 2:
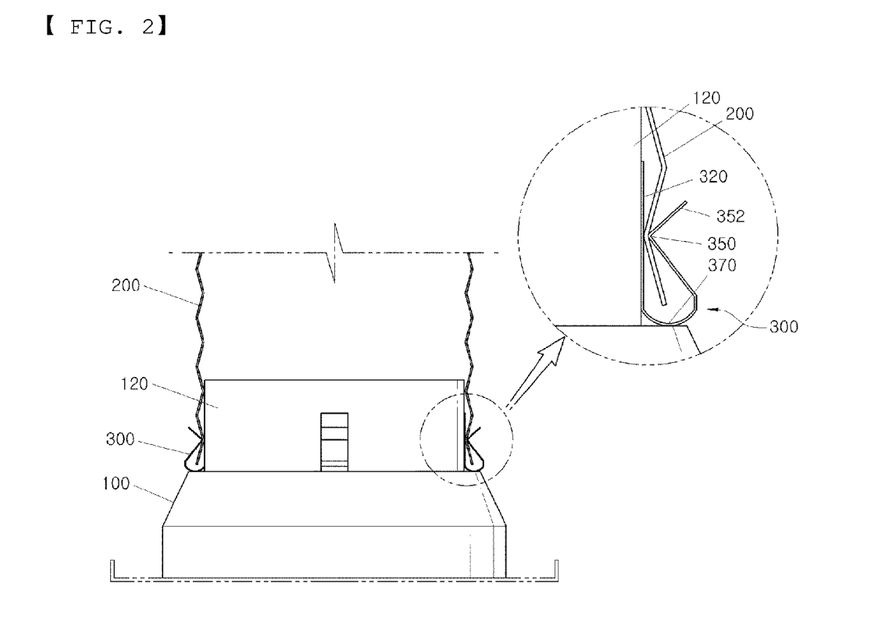
FIG. 2 is an exemplary view of a state in which a corrugated pipe is coupled to an object to be coupled by using the clip according to the present invention.

FIG. 1 is an exemplary view showing an example of a clip according to the present invention. FIG. 2 is an exemplary view of a state in which a corrugated pipe is coupled to an object to be coupled by using the clip according to the present invention.

As shown in the drawings, the clip 300 according to the present invention is installed on the object 100. The clip 300 is firmly fixed to an outer periphery of a connection pipe 120 formed on the object 100.

The clip 300 is formed of a plate formed in a plank shape. A fixing plate 320 is formed to have a predetermined length and a pressing protrusion 350 extends to protrude in a direction facing the fixing plate 320. The fixing plate 320 and the pressing protrusion 350 lead have lower portions, more precisely, lower ends connected to each other through an extension plate 370.

The extension plate 370 may be formed to have a downward convex round shape. The extension plate 370 serves to exert elasticity to the pressing protrusion 350, and may be formed in a downward convex round shape to allow an elastic force to be concentrated toward a center of the extension plate 370, thereby improving elasticity.

In this embodiment, the pressing protrusion 350 convexly protrudes by bending the plate. As a result, an upper end of the pressing protrusion 350 may be inclined in a direction away from the fixing plate 320 to form a handle portion 352. When the handle portion 352 is pulled, the pressing protrusion 350 is spaced apart from the fixing plate 320. As the inlet of the clip 300 is widened, the corrugated pipe 200 is inserted through the widened inlet in the above manner. Then, when the force pulling the handle portion 352 is removed, the pressing protrusion 350 presses the corrugated pipe 200, and thus, the corrugated pipe 200 is prevented from being separated from the connection pipe 120.

The handle portion 352 serves to allow the corrugated pipe 200 to be stably fitted, in addition to being held and pulled by hand. When the corrugated pipe 200 is pulled toward the inside of the clip 300 without opening the handle portion 352 after placed on the inlet of the clip 300, the corrugated pipe 200 is fitted into the clip 300 through the inlet of the clip 300.

Figure 3:
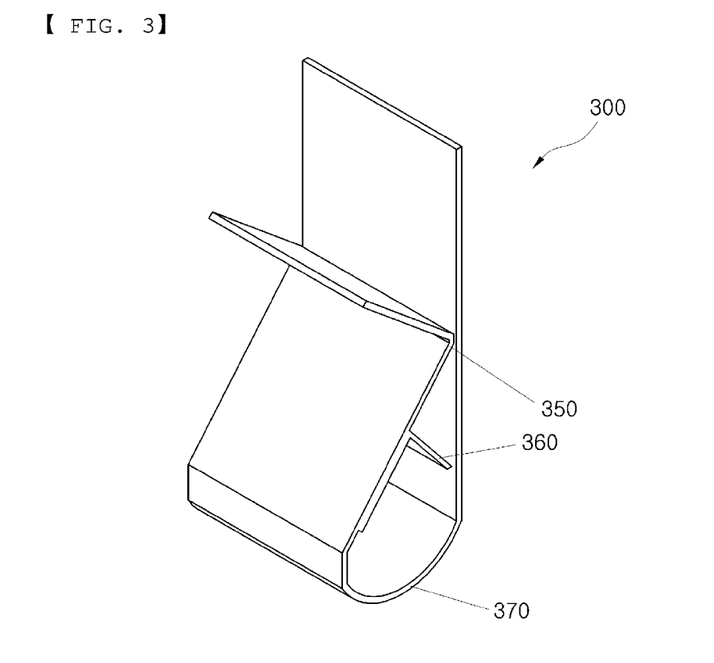
FIG. 3 is an exemplary view showing another example of the clip according to the present invention.
Figure 4:
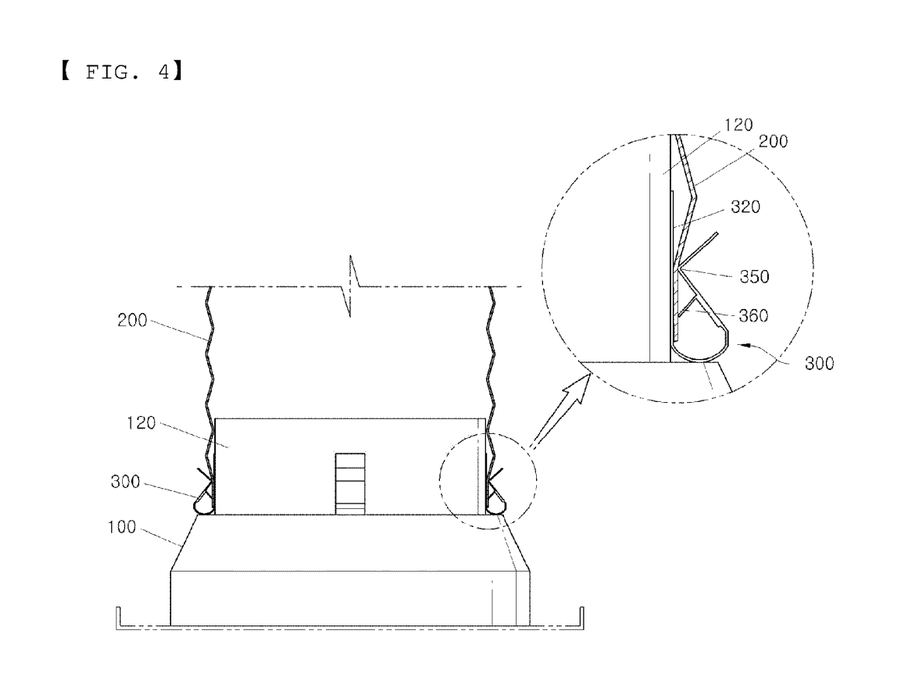
FIG. 4 is an exemplary view of a state in which the corrugated pipe is coupled to the object to be coupled by using the clip in FIG. 3.

FIG. 3 is an exemplary view showing another example of the clip according to the present invention. FIG. 4 is an exemplary view of a state in which the corrugated pipe is coupled to the object to be coupled by using the clip in FIG. 3.

This embodiment shows a structure in which the latching protrusion 360 is further formed on the clip 300. The clip 300, as described in the above manner, is provided while being fixed to the connection pipe 120 formed on the object 100.

The latching protrusion 360 has a plate shape, and is further formed below a lower portion of the pressing protrusion 350 so as to be inclined downwardly toward the fixing plate 320. The latching protrusion 360 formed in the above manner is latched by the end of the corrugated pipe 200 fitted through the inlet of the clip 300. The corrugated pipe is latched to the latching protrusion 360 once more in addition to being latched to the pressing protrusion 350, so that the corrugated pipe 200 is supported more firmly, so as to be prevented from being separated from the object 100.

Figure 5:
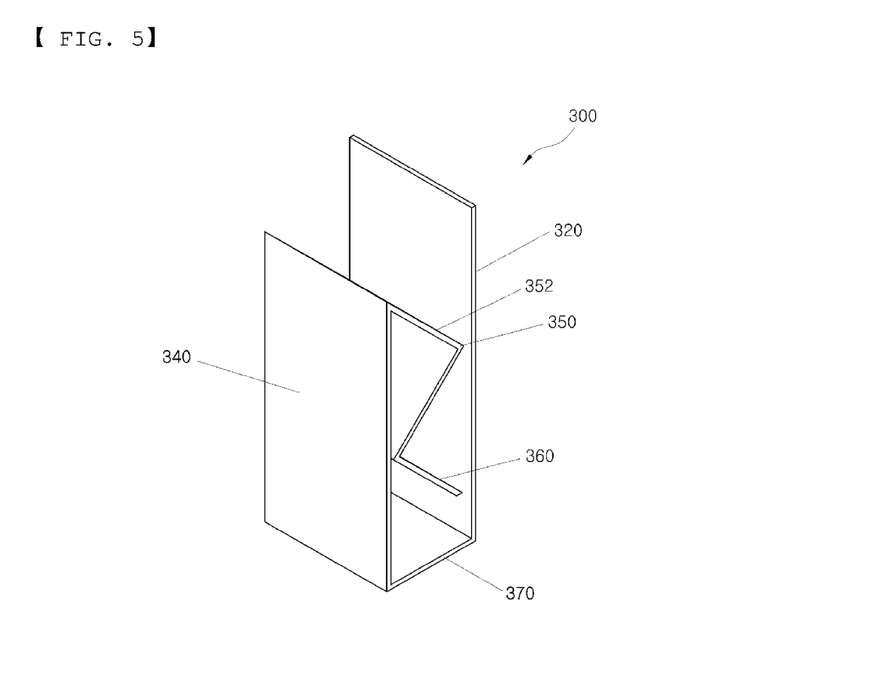
FIG. 5 is an exemplary view showing still another example of the clip according to the present invention.
Figure 6:
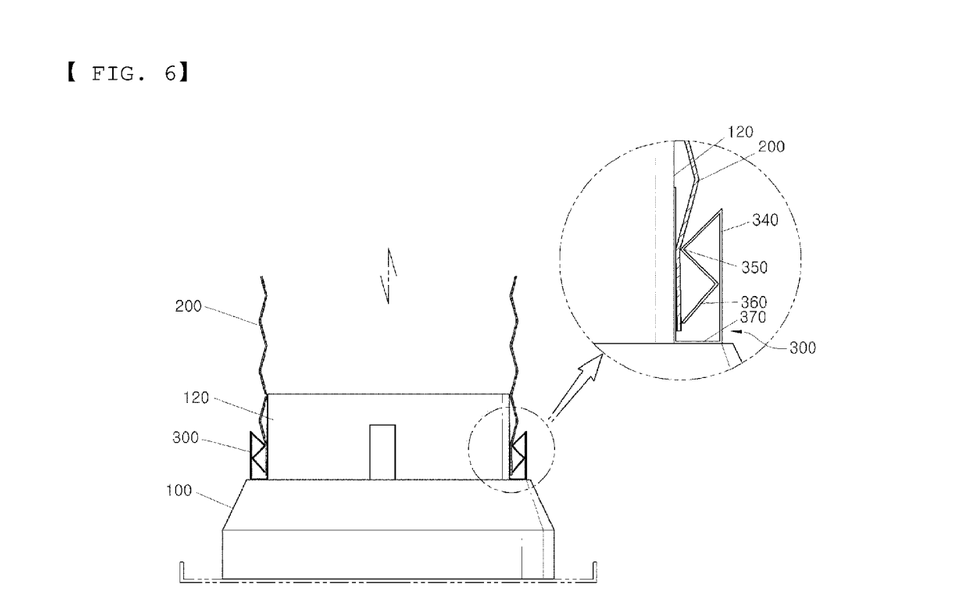
FIG. 6 is an exemplary view of a state in which the corrugated pipe is coupled to the object to be coupled by using the clip in FIG. 5.

FIG. 5 is an exemplary view showing still another example of the clip according to the present invention. FIG. 6 is an exemplary view of a state in which the corrugated pipe is coupled to the object to be coupled by using the clip in FIG. 5.

The present embodiment illustrates a structure of the clip 300 in which the pressing protrusion 350 is formed on the support plate 340. The clip 300, as described in the above manner, is provided while being fixed to the connection pipe 120 formed on the object 100.

The support plate 340 has a plate shape, is formed in parallel with the fixing plate 320 at a predetermined interval, and has a lower end connected to the fixing plate 320 through the extension plate 370. In the above configuration, an upper end of the pressing protrusion 350 is connected to the support plate 340. As a result, the pressing protrusion 350 is configured to be accommodated between the fixing plate 320 and the support plate 340. Accordingly, the support plate 340 may prevent the upper end of the pressing protrusion 350 from protruding, so that an appearance can be arranged neatly. In addition, a hand or tool may be prevented from being caught on the upper end of the pressing protrusion during the work process. Particularly, since the end of the handle portion 352 is formed sharp in the embodiment of FIGS. 1 and 2 above, there is a possibility that the worker's hand may be injured in the process of inserting the corrugated pipe 200 into the clip 300 installed on the object 100. However, the injury can be prevented according to the present invention.

In this embodiment, the latching protrusion 360 may be formed below the pressing protrusion 350. A lower end of the pressing protrusion 350 may be inclined downward toward the fixing plate 320. In other words, a plate formed at a predetermined length in the lower portion of the pressing protrusion 350 may be inclined downward toward the fixing plate 320, thereby forming the latching protrusion 360.

In addition, the extension plate 370 may be formed in an arc shape convex downward in this embodiment as well.

Figure 7:
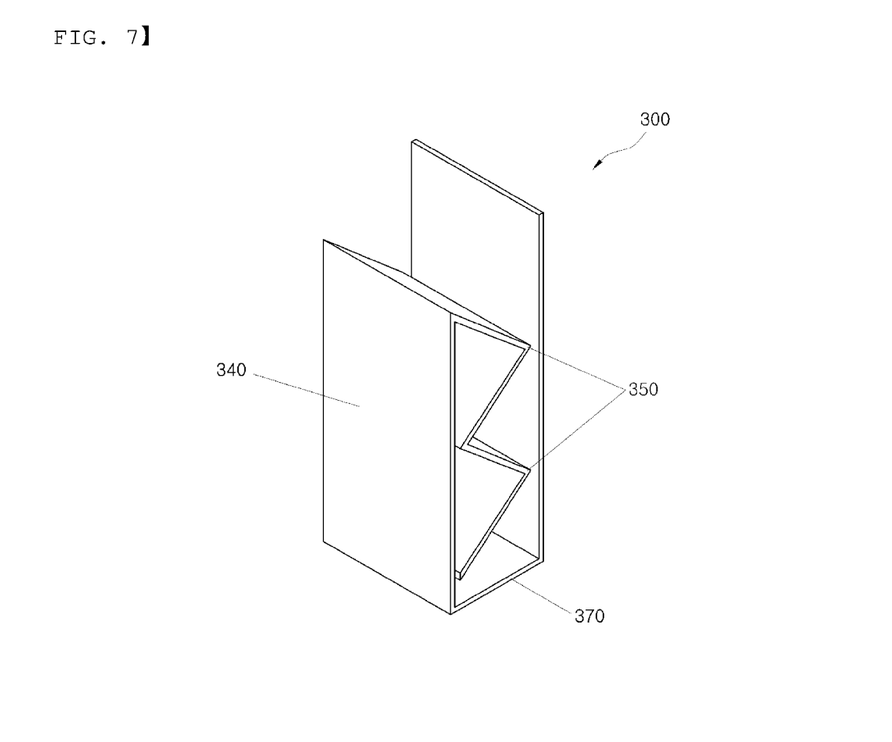
FIG. 7 is an exemplary view showing still another example of the clip according to the present invention.
Figure 8:
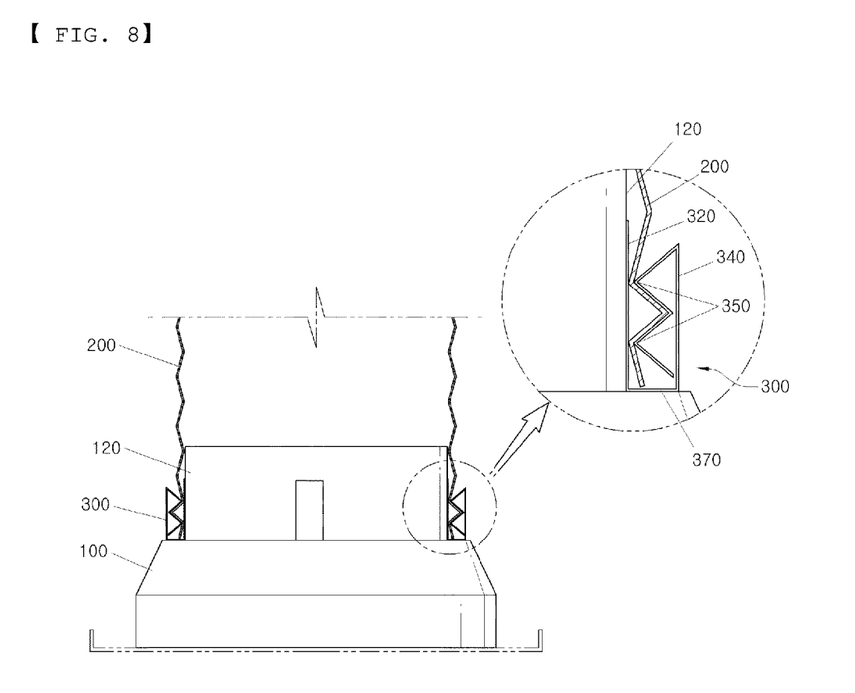
FIG. 8 is an exemplary view of a state in which the corrugated pipe is coupled to the object to be coupled by using the clip in FIG. 7.

FIG. 7 is an exemplary view showing still another example of the clip according to the present invention. FIG. 8 is an exemplary view of a state in which the corrugated pipe is coupled to the object to be coupled by using the clip in FIG. 7.

This embodiment illustrates a structure of the clip 300 in which the pressing protrusion 350 is formed on the support plate 340 and a plurality of the pressing protrusions 350 are formed. The clip 300, as described in the above manner, is provided while being fixed to the connection pipe 120 formed on the object 100.

The support plate 340 has a plate shape, is formed in parallel with the fixing plate 320 at a predetermined interval, and has a lower end connected to the fixing plate 320 through the extension plate 370. In addition, an upper end of the pressing protrusion 350 is connected to the support plate 340. Accordingly, the pressing protrusion 350 is configured to be accommodated between the fixing plate 320 and the support plate 340. At this point, the pressing protrusion 350 includes a plurality of pressing protrusions formed continuously with each other vertically. The drawings exemplifies the structure in which two pressing protrusions are continuously formed.

According to the above configuration, the pressing protrusion 350 includes multiple pressing protrusions, so that the force for pressing the corrugated pipe 200 may be increased according to the number of pressing protrusions. As a result, the corrugated pipe 200 is more firmly coupled to the object 100.

The extension plate 370 may be formed in an arc shape convex downward in this embodiment as well.

Figure 9:
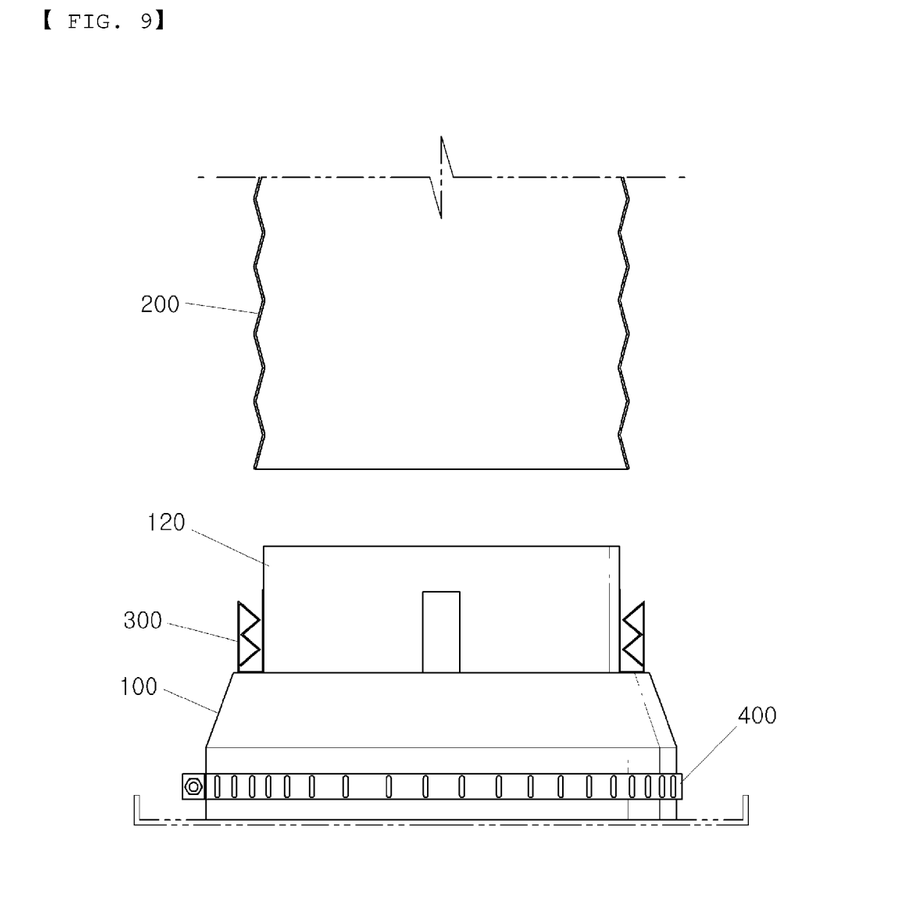
FIG. 9 is an exemplary view of a state in which a compression band according to the present invention is mounted on the object to be coupled.
Figure 10:
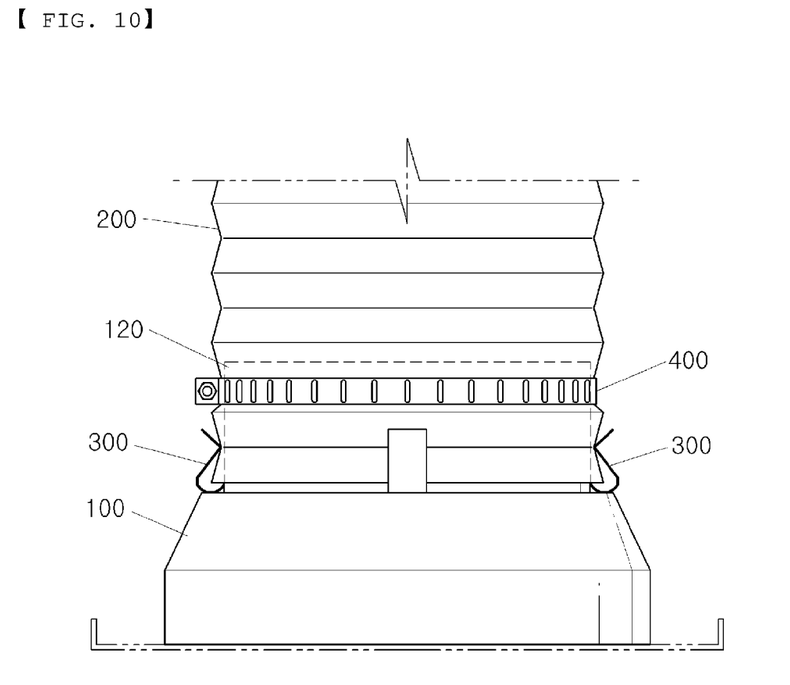
FIG. 10 is an exemplary view showing a state of use of the compression band according to the present invention.

FIG. 9 is an exemplary view of a state in which a compression band according to the present invention is mounted on the object to be coupled. FIG. 10 is an exemplary view showing a state of use of the compression band according to the present invention.

The pipe connection structure of the air-conditioning system according to the present invention described above may further include a tie belt 400.

The clip 300, as described in the above manner, is provided while being fixed to the connection pipe 120 formed in the object 100, and the tie belt 400 is used in a state where the corrugated pipe 200 is fitted and coupled to the clip 300.

The tie belt 400 has a ring shape to adjust a diameter, and is installed to surround the corrugated pipe 200 while the corrugated pipe 200 is coupled to the clip 300, so as to be tightened as necessary. The tie belt 400 is strongly tightened and pressed so that the corrugated pipe 200 is in close contact with the connection pipe 120. In the above configuration, the corrugated pipe 200 is required to be formed to have a sufficient length to allow the tie belt 400 to be installed.

The tie belt 400 may employ a cable tie, a SUS-band, and the like. Any component adjustable in length may be employed. The corrugated pipe 200 may be tightly tied using the tie belt 400 once more while being coupled to the clip 300, so that the corrugated pipe 200 may be connected to the object 100 significantly firmly.

The tie belt 400 may be provided in a state mounted on the object 100. In the related art, the worker directly lifts and moves the object 100 toward the ceiling or wall to connect in a state where the corrugated pipe 200 is installed on the ceiling or wall in advance. At this point, the worker also carries tools for the work. However, according to the present invention, since the tie belt 400 is provided while being mounted on the object 100 as described above, the worker may carry and move the object 100 only, without separately carrying the tie belt 400. Accordingly, the carry is easily performed, and the worker does not need to hold the tie belt 400 by hand even during installation. Accordingly, even upon the work for connecting to the corrugated pipe 200, the corrugated pipe 200 is connected to the clip 300 in a one-touch type, and then the tie belt 400 mounted on the object 100 is just required to be fastened toward the corrugated pipe 200, so that the installation work may also be remarkably easily conducted.

DESCRIPTION OF REFERENCE NUMERALS

100: Object to be coupled
120: Connection pipe
200: Corrugated pipe
300: Clip
320: Fixing plate
340: Support plate
350: Pressing protrusion
352: Handle portion
360: Latching protrusion
370: Extension plate
400: Tie belt

The invention claimed is:

1. A pipe connection structure of an air-conditioning system, the pipe connection structure comprising:
a clip (300) provided on an object (100) to be coupled in which a corrugated pipe (200) is fitted and coupled to the clip (300), wherein:
the clip (300) includes a fixing plate (320) fixed to the object (100) to be coupled, and a pressing protrusion (350) convexly formed in a direction facing the fixing plate (320), and
when an end of the corrugated pipe (200) is inserted between the fixing plate (320) and the pressing protrusion (350) while the fixing plate (320) is fixed to the object (100), the pressing protrusion (350) presses the corrugated pipe (200) so as to prevent the corrugated pipe (200) from being separated, wherein:
the clip (300) includes an extension plate (370) extending from a lower end of the fixing plate (370) away from the object (100), and a support plate (340) extending from an end of the extension plate (370) and erected upward, and
the pressing protrusion (350) includes a plurality of pressing protrusions formed in a height direction and is formed by convexly bending a plate, in which an upper end of the plate extending from the support plate (340) so that the pressing protrusion (350) is accommodated between the fixing plate (320) and the support plate (340).

2. The pipe connection structure of claim 1, wherein the pressing protrusion (350) is formed by convexly bending a plate, in which a lower end of the plate extends to a lower end of the fixing plate (320) through an extension plate (370), and an upper portion of the plate is inclined in a direction away from the fixing plate (320) to form a handle portion (352).

3. The pipe connection structure of claim 2, wherein the extension plate (370) has a downward convex round shape, thereby improving elasticity.

4. The pipe connection structure of claim 2, wherein a latching protrusion (360) inclined downwardly toward the fixing plate (320) is further formed below a lower portion of the pressing protrusion (350), so that the corrugated pipe (200) is latched to the latching protrusion (360).

5. The pipe connection structure of claim 1, wherein a latching protrusion (360) inclined downwardly toward the fixing plate (320) is further formed below a lower portion of the pressing protrusion 350, so that the corrugated pipe (200) is latched to the latching protrusion (360).

6. The pipe connection structure of claim 1, further comprising:
a tie belt (400) for tightly pressing the corrugated pipe (200) to the object (100) while the corrugated pipe (200) is coupled to the clip (300).

* * * * *